United States Patent [19]

Härig et al.

[11] Patent Number: 5,357,375
[45] Date of Patent: Oct. 18, 1994

[54] SYMMETRICAL PRISM BEAM DEFLECTOR

[75] Inventors: Thomas J. Härig, Eppstein; Manfred Maul, Sulzbach, both of Fed. Rep. of Germany

[73] Assignee: Linotype-Hell AG, Eschborn, Fed. Rep. of Germany

[21] Appl. No.: 71,471

[22] Filed: Jun. 4, 1993

[51] Int. Cl.[5] .................... G02B 26/10; G02B 5/04
[52] U.S. Cl. .................... 359/211; 359/834
[58] Field of Search ............... 359/211, 834, 833, 837

[56] References Cited
U.S. PATENT DOCUMENTS

| | | | |
|---|---|---|---|
| 3,574,459 | 4/1971 | Hartwig et al. | 355/66 |
| 3,875,587 | 4/1975 | Pugsley | 358/80 |
| 4,475,787 | 10/1984 | Starkweather | 359/211 |
| 4,591,263 | 5/1986 | Fergg | 355/43 |
| 4,690,485 | 9/1987 | Plaot | 350/6.5 |
| 4,875,720 | 10/1989 | Sasa et al. | 285/249 |
| 4,934,780 | 6/1990 | McGrath | 359/211 |
| 5,026,133 | 6/1991 | Roddy et al. | 350/6.4 |

FOREIGN PATENT DOCUMENTS

| | | | |
|---|---|---|---|
| 0354028 | 2/1990 | European Pat. Off. | G11B 7/00 |
| 3707023A1 | 9/1988 | Fed. Rep. of Germany | G02B 26/10 |
| 4014837A1 | 11/1991 | Fed. Rep. of Germany | G02B 26/10 |
| WO90/15355 | 12/1990 | PCT Int'l Appl. | G02B 26/10 |
| 1062883 | 12/1983 | U.S.S.R. | 359/211 |
| 1210110A | 2/1986 | U.S.S.R. | G02B 5/04 |
| 1652952A1 | 5/1991 | U.S.S.R. | G02B 5/04 |

*Primary Examiner*—Jon W. Henry
*Attorney, Agent, or Firm*—Hill, Steadman & Simpson

[57] ABSTRACT

An apparatus for deflecting an optical beam is designed as a prism and has an entry face as well as two reflection faces and two exit faces. The prism is essentially symmetrically constructed with reference to a rotational axis. The entry face is oriented essentially perpendicularly relative to the rotational axis. Those sides of the prism facing away from the entry face are designed as reflection faces having an inclination relative to the rotational axis, these reflection faces adjoining one another in the region of the rotational axis. Those sides of the prism facing away from the rotational axis are designed as exit faces which adjoin the entry face and the respective reflection face and, proceeding from the entry face, extend with increasing distance from the rotational axis.

23 Claims, 3 Drawing Sheets

SYMMETRICAL PRISM BEAM DEFLECTOR

BACKGROUND OF THE INVENTION

The invention refers to the field of reproduction technology and is directed to an apparatus for deflecting an optical beam. The apparatus is essentially designed as a prism and has an entry face as well as at least one reflection face and an exit face.

Devices for deflecting optical radiation are employed, for example, in originals scanner devices or in recording devices.

In an originals scanning device, also referred to as an input scanner, a light beam is conducted line-by-line with a light deflector across an original to be scanned, and wherein the scan light reflected by the original or transmitted through the original is converted into an image signal in an opto-electronic converter. In a recording device, also referred to as a recorder, an exposer or an output scanner, a light beam for recording information is intensity-modulated by an image signal and is conducted line-by-line across a light-sensitive recording material with a beam deflector.

When the scanning or recording device is designed as a flat bed device, the holder for the original or for the recording material is a planar surface across which the light ray is deflected line-by-line, and that moves relative to the light deflector perpendicularly relative to the deflection plane.

When the scanning or recording device is designed as an inside drum device, the holder for the original or for the recording material is a non-rotational inside drum designed like a cylindrical segment. The light deflector moves relative to the inside drum parallel to its longitudinal axis, and the light beam is radially deflected across the inside surface of the inside drum perpendicularly to the longitudinal axis.

For example, U.S. Pat. No. 3,875,587 discloses an apparatus for deflecting an optical beam in an inside drum recording device. The apparatus therein is designed as a pentaprism. The pentaprism that rotates around the longitudinal axis moves across the inside drum in the axial direction, as a result whereof a recording beam that is modulated with the information to be recorded and proceeds parallel to the inside drum axis is perpendicularly deflected onto the inside surface of the inside drum line-by-line by the pentaprism.

A pentaprism has no pyramid errors such as, for example, a polygonal mirror, and is insensitive to small rotations around the axis perpendicular to the principal section, so that the recording beam is deflected by exactly 90°, even given an angular wobble that arises due to tolerances in the region of the bearing for the pentaprism. A good recording quality is in fact achieved by employing a pentaprism as a beam deflector; one disadvantage, however, is that respectively only one line can be recorded per revolution of the pentaprism. As a consequence of the relatively poor degree of utilization per revolution (duty cycle) of the pentaprism, thus only a low recording speed can be achieved.

Another device for deflecting an optical beam in an inside drum recording apparatus is disclosed by EP-A-0 354 028. Given the rotating prism recited therein, two recording beams are generated having an offset of approximately 180°, as a result whereof two lines can be recorded on the recording material per revolution of the prism. The recording speed can in fact be enhanced with this apparatus. However, it has the disadvantage that an angular wobble is doubled, and thus the recording quality is substantially reduced.

Another apparatus for beam deflection is disclosed by WO 90/15355. In order to alleviate the influences of disturbances, two reflection faces are arranged herein the region of a rotating shaft, the first reflection face thereof facing toward a beam source deflecting the light ray in the direction onto the second reflection face and the latter aligning the light ray onto a material to be exposed. This apparatus has the disadvantage that only one line per revolution can again be exposed on the recording material. An angular wobble is completely suppressed in this apparatus.

U.S. Pat. No. 4,875,720 recites different prism shapes that completely suppress angular wobble, but do not allow the production of two recording beams.

It is not possible with the assistance of the known apparatus to realize a beam deflector such that it is both simply constructed in structural terms and also guarantees a qualitatively high-grade transmission of an optical beam. In particular, the known apparatus are not in the position to undertake a reduction of an angular wobble to an adequate extent.

SUMMARY OF THE INVENTION

It is an object of the invention to improve an apparatus for deflecting an optical beam such that a qualitatively high-grade deflection is enabled, while guaranteeing a compact arrangement.

According to the invention, a device is provided for deflecting an optical beam formed of a prism having an entry face as well as reflection faces and exit faces. The prism has a substantially symmetrical structure with reference to a rotational axis. The entry face is oriented substantially perpendicularly relative to the rotational axis. Sides of the prism facing away from the entry face are designed as the reflection faces having an inclination relative to the rotational axis and which adjoin one another in a region of the rotational axis. Sides of the prism facing away from the rotational axis are designed as the exit faces which adjoin the entry face and a respective reflection face, and which extend from the entry face with increasing distance from the rotational axis.

DESCRIPTION OF THE PREFERRED EMBODIMENTS

Figure 1:
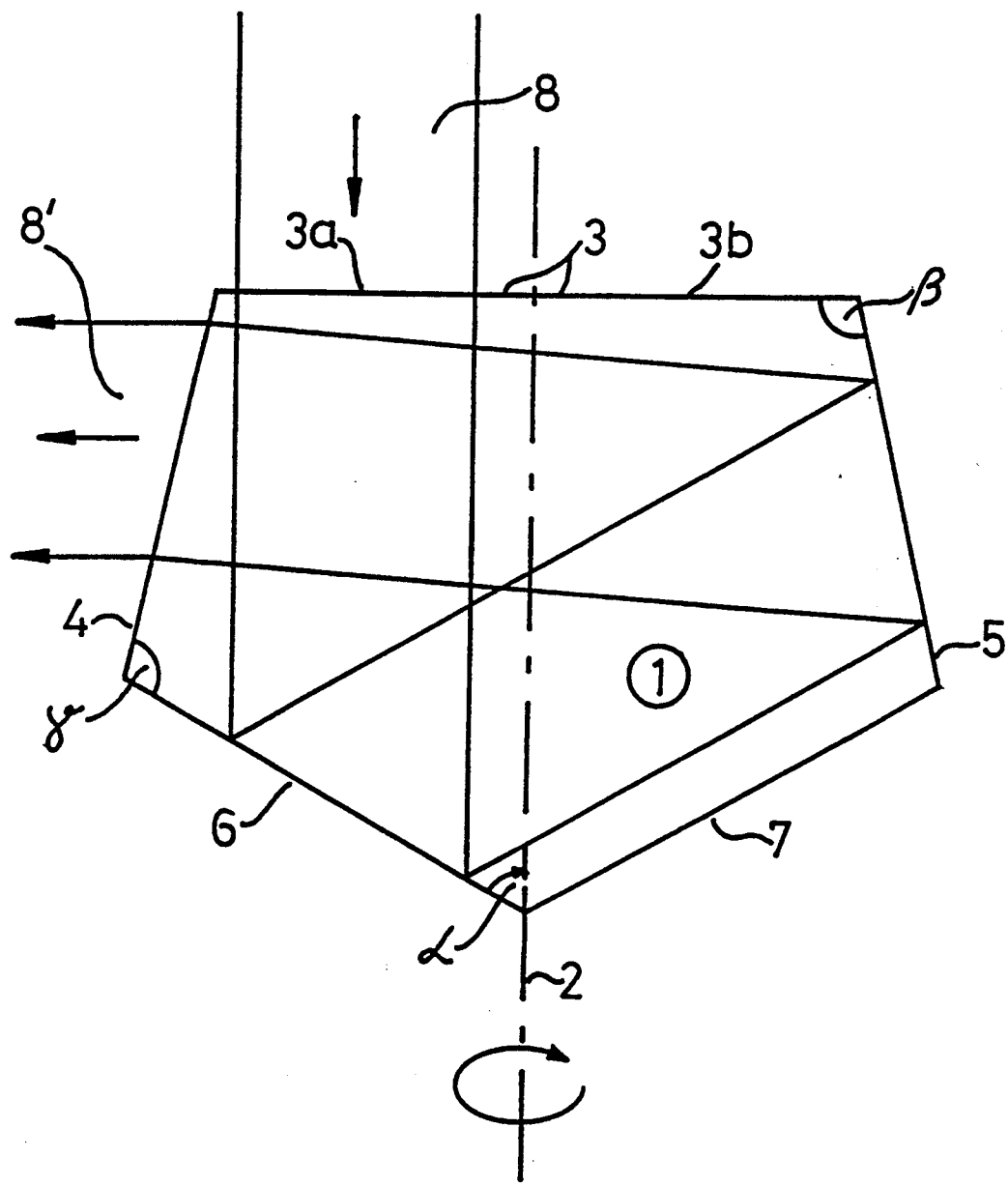
FIG. 1 is an exemplary embodiment of an apparatus for deflecting an optical beam, shown in section.

FIG. 1 shows in section an exemplary embodiment for an apparatus for the deflection of an optical beam.

The apparatus, referred to below as a beam deflector, is essentially composed of a prism 1 which is symmetrically designed with respect to a rotational axis 2 and rotates around the rotational axis 2. The prism comprises an entry face 3, exit faces 4, 5 and reflection faces 6, 7. The entry face 3, aligned perpendicularly relative to the rotational axis 2, is divided into two entry regions 3a, 3b, whereby the parting line proceeds through the rotational axis 2. The reflection faces 6, 7 are arranged at that side of the prism 1 facing away from the entry face 3, abut one another in the region of the rotational axis 2, and respectively describe an angle $\alpha$ with the rotational axis 2. The faces of the prism 1 facing away from the rotational axis 2 form the exit faces 4, 5 that are arranged inclined relative to the rotational axis 2. The exit faces 4, 5 respectively describe an angle $\beta$ with the entry face 3 and an angle $\gamma$ with the respectively adjoining reflection faces 6, 7.

Dependent on the prism material employed and on the respective use specification, the possible angular range for the angle $\alpha$ lies between 50° and 70°, between 90° and 110° for the angle $\beta$, and between 90° and 120° for the angle $\gamma$. Given a prism material BK7, typical values are $\alpha=60°$, $\beta=102.8°$, and $\gamma=107.2°$.

The exit faces 4, 5 are designed partially mirrored, so that a part of the light energy of an incident light beam 8 is either reflected into the interior of the prism 1 or is allowed to pass refracted, dependent on the incident angle. What is understood by partially mirrored is that the exit faces 4, 5 have approximately a 25 through 75% transmission given an incidence from 0° through 20°, and have a 25 through 75% reflection given an incidence from 20° through 70°. Only that part of the ray beam 8 belonging to the useful beam path is respectively shown at the partially mirrored surfaces.

The reflection faces 6, 7 are aligned relative to one another with respect to the exit faces 4, 5 such that the light beam 8 reflected by one reflection face 6 or 7 is respectively cast back at the opposite exit face 4 or 5 into the interior of the prism in the direction onto the exit face 4 or 5 adjoining the corresponding reflection face 6 or 7. Moreover, the exit faces 4, 5 are arranged relative to one another such that the light beam 8 reflected at an exit face 4 or 5 is allowed to pass through the exit face 5 or 4 lying opposite, and leaves the prism 1.

The light beam 8 which emanates from a light source (not shown) and preferably proceeds parallel to the rotational axis 2 of the prism 1—only the edge rays of this light beam 8 being shown—is incident onto one of the entry regions 3a, 3b of the entry face 3 asymmetrically relative to the prism 1, dependent on the rotational position of the prism 1, namely onto the entry region 3a in the rotational position that is shown in FIG. 1.

The corresponding beam path is shown in FIG. 1. The incident light beam 8 passes through the prism 1, is deflected at the reflection face 5, and is reflected in the direction toward the exit face 4 at the exit face 5. The angle of incidence with which the reflected light beam 8 is incident onto the exit face 4 is selected such that that reflected light beam 8 is allowed to pass by the exit face 4 and leaves the prism 1 as light beam 8'.

Figure 2:
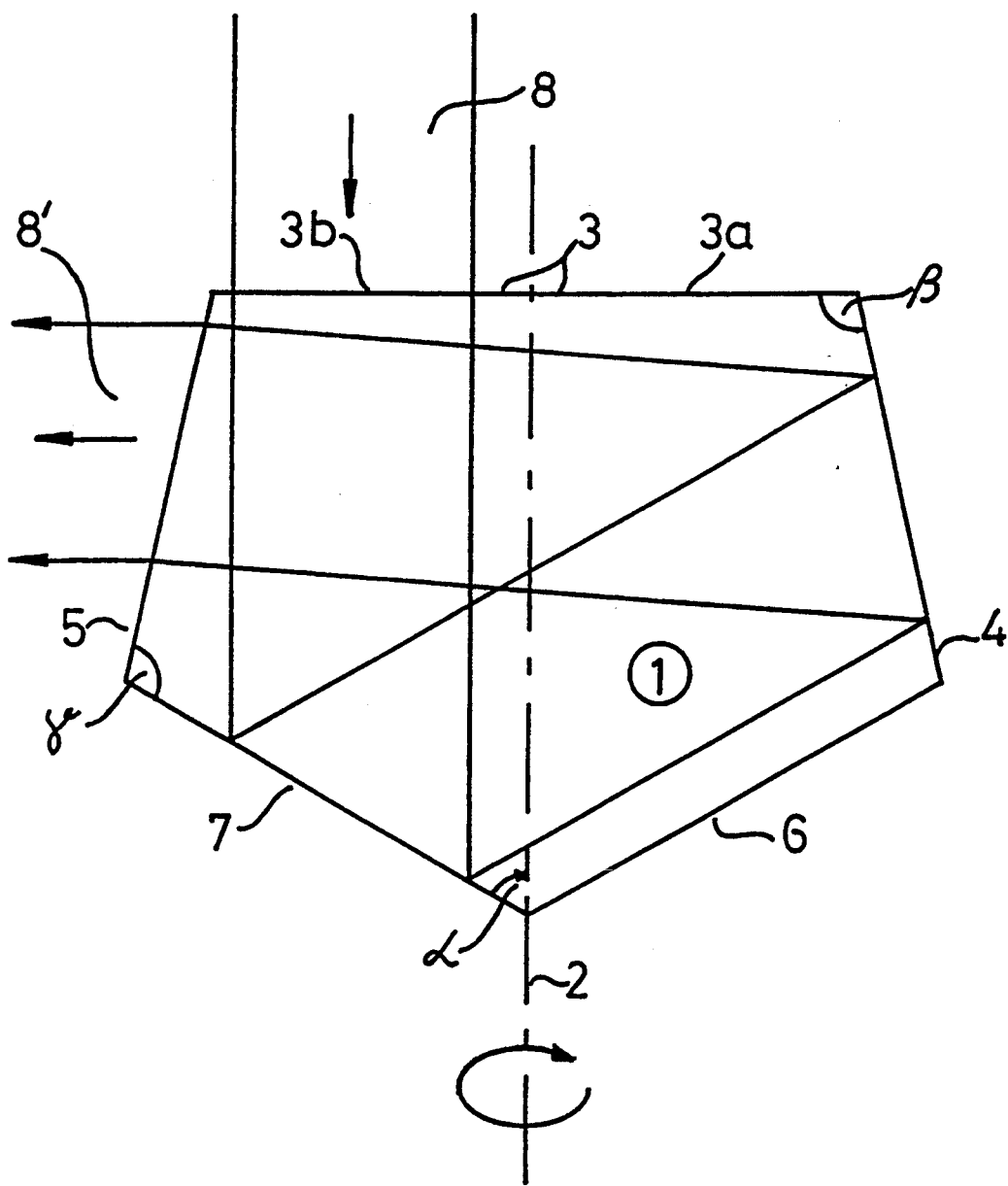
FIG. 2 shows the apparatus in a position rotated by 180°.

FIG. 2 shows the corresponding beam path in the prism I for that case wherein the prism 1 has rotated by 180° around the rotational axis 2.

In this rotational position, the entry regions 3a, 3b, the exit faces 4, 5, and the reflection faces 6, 7 have exchanged their spatial arrangement with respect to the light beam 8. The light beam 8 is now deflected at the reflection face 7 and is reflected at the exit face 4 in the direction onto the exit face 5, which allows it to pass as light beam 8'. Both beam paths shown in FIGS. 1 and 2 are symmetrical with respect to the rotational axis 2.

Due to the common utilization of the interior space of the prism for both beam paths, the prism 1 can be designed extremely compact, and thus can be simply manufactured. Due to the refraction of the light beam at the exit face 4 or 5 of the prism 1, the error in area can preferably be adjusted out by tilting the prism 1, and the pyramid error can be compensated. The prism 1 is nonetheless relatively insensitive to bearing wobble, since a bearing wobble is stepped down at approximately 1:60 due to the geometrical design.

Taking the refractive index of the prism material employed into consideration, the angles of the prism faces are expediently designed such that a 90° light deflector arises with which a light beam 8 incident parallel to the rotational axis 2 emerges from the prism 1 perpendicularly relative to the rotational axis 2 as light beam 8'.

Due to the rotation of the light deflector or of the prism 1 around the rotational axis 2, the light beam 8 is successively incident onto both entry regions 3a, 3b of the entry face 3 during a revolution, so that the light deflector generates two chronologically offset light beams 8' per revolution with dead times lying therebetween wherein the light deflector is not used.

Due to the generation of two deflected light beams 8' per revolution, the light deflector advantageously has a higher degree of utilization (duty cycle) in comparison to a traditional pentaprism. The light beams 8' are deflected by the light deflector in a plane perpendicular to the rotational axis 2 and over a usable angular range that results from the time interval wherein respectively one entry region 3a or 3b is impinged by the full cross section of the incident light beam 8. It must thereby be assured that the spacing of the center line of the incident light beam 8 from the rotational axis 2 is always greater than the diameter of the light beam 8. The usable deflection angle is thus dependent on the geometry of the entry regions 3a, 3b and of the light beam cross section. A typical value for the usable deflection angle is $+/-36°$.

In order to avoid stray light, it has proven advantageous to shut off or blank the incident light beam 8 when it runs over the edges of the prism 1. A control circuit that is synchronized with the rotational motion of the prism 1 can be provided for this purpose.

The light deflector of the invention can be advantageously utilized in originals scanner devices and in recording devices of the flat bed type or inside drum type.

In an originals scanning device of the flat bed type, the original to be scanned is clamped on a planar originals carrier (flat bed). A light beam is conducted across the original point-by-point and line-by-line by the rotating light deflector, and the scan light reflected or transmitted by the original is converted into an image signal in an optoelectronic converter.

In a recording device of the flat bed type, a recording material is arranged on the flat bed. A light beam modulated with the information to be recorded is guided across the recording material point-by-point and line-by-line with the light deflector and undertakes the recording.

It proves expedient in devices of the flat bed type to charge the light deflector with an essentially parallel light beam and to arrange an objective, for example, an f theta objective, that shapes the picture element between the original or recording material and light deflector. As a result thereof, angular errors and parallel offsets due to bearing wobble are completely or at least greatly compensated.

In a scanner or recording device of the inside drum type, the mount for the original or for the recording material is a non-rotational inside drum shaped like a cylindrical segment. The light deflector moves relative to the inside drum parallel to its longitudinal axis, and the light beam is radially deflected across the inside drum perpendicularly relative to the longitudinal axis.

Figure 3:
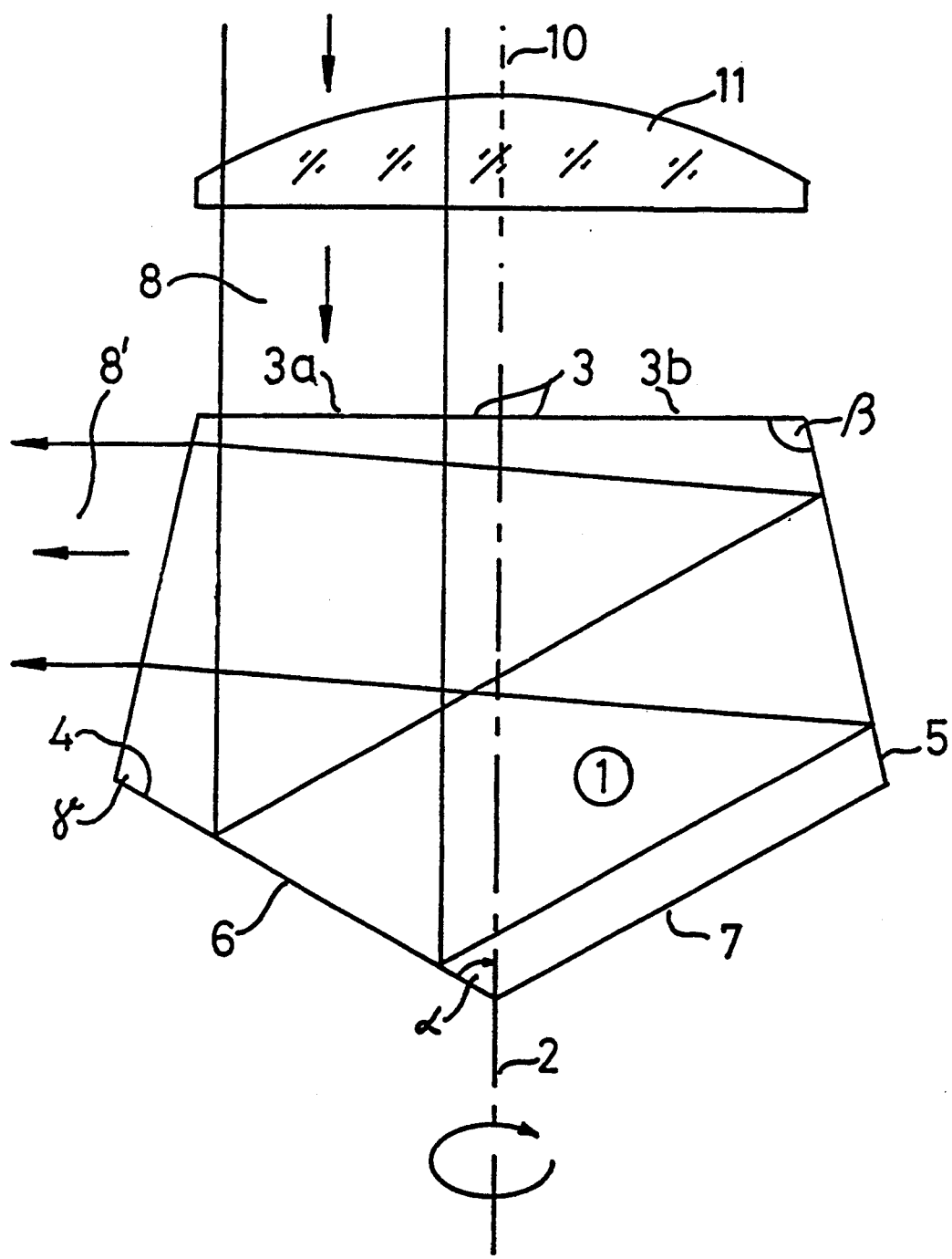
FIG. 3 is an embodiment of the apparatus.

In devices of the inside drum type, the objective that shapes the picture element is expediently arranged in the beam path between the light source and the light deflector. In combination with the light deflector of the invention, it proves advantageous according to the illustration in FIG. 3 when the optical axis 10 of the objective 11 coincides with the symmetry axis or rotational axis 2 of the prism 1.

The objective 11 can be stationarily arranged or, on the other hand, can be rigidly coupled to the prism 1, and can co-rotate after it has been adjusted relative to the prism 1. In the case of the coupling, the objective 11 is connected to the prism 1 by gluing or with a mount. There is thereby the possibility of also compensating slight manufacturing tolerances of the prism 1 at the same time via the adjustment.

Although various minor changes and modifications might be suggested by those skilled in the art, it will be understood that we wish to include within the claims of the patent warranted hereon all such changes and modifications as reasonably come within our contribution to the art.

We claim as our invention:

1. A device for deflecting an optical beam, comprising:
    a prism having an entry face as well as reflection faces and exit faces;
    the prism having a substantially symmetrical structure with reference to a rotational axis;
    the entry face being oriented substantially perpendicularly relative to the rotational axis;
    sides of the prism facing away from the entry face being designed as said reflection faces and which have an inclination relative to the rotational axis and adjoin one another in a region of the rotational axis; and
    sides of the prism facing away from the rotational axis being designed as said exit faces and which adjoin the entry face and a respective reflection face and extend from the entry face with increasing distance from the rotational axis.

2. An apparatus according to claim 1 wherein the entry face is subdivided into entry regions spatially separated from one another for said optical beam that is incident onto the prism at a distance from the rotational axis.

3. An apparatus according to claim 2 wherein centers of the entry regions each respectively have a same spacing from the rotational axis.

4. An apparatus according to claim 1 wherein a spacing of a center line of the optical beam from the rotational axis is greater than a diameter of the optical beam.

5. An apparatus according to claim 1 wherein an angle of inclination between the entry face and the respective exit face has a value in a range from approximately 90° through 110°.

6. An apparatus according to claim 5 wherein said angle of inclination has a value of 102.8°.

7. An apparatus according to claim I wherein an angle of inclination between the respective exit face and the adjoining reflection face respectively has a value in a range from approximately 90° through 120°.

8. An apparatus according to claim 7 wherein said angle of inclination has a value of 107.2°.

9. An apparatus according to claim 1 wherein an angle of inclination between the respective reflection face and the rotational axis respectively has a value in a range from 50° through 70°.

10. An apparatus according to claim 9 wherein said angle of inclination has a value of 60°.

11. An apparatus according to claim 1 wherein angles of inclination of the prism faces are selected such that, taking optical properties of material of the prism into consideration, the optical beam incident onto the prism parallel to the rotational axis departs the prism perpendicularly relative to the rotational axis.

12. An apparatus according to claim 1 wherein the exit faces are partially mirrored.

13. An apparatus according to claim 1 wherein the incident optical beam is respectively shut off when it runs over edges of the prism.

14. An apparatus according to claim 1 wherein the incident optical beam is blanked when it runs over edges of the prism.

15. An apparatus according to claim 1 wherein the prism is employed as a light deflector in a flat bed scanner device.

16. An apparatus according to claim 15 wherein a f-theta objective is arranged between the prism and a flat bed.

17. An apparatus according to claim 15 wherein the prism is employed as a light deflector in a flat bed recording device.

18. An apparatus according to claim 17 wherein a f-theta objective is arranged between the prism and a flat bed.

19. An apparatus according to claim 1 wherein the prism is employed as a light deflector in an inside drum scanner device or an inside drum recording device.

20. An apparatus according to claim 19 wherein an objective is arranged in front of the entry face of the prism.

21. An apparatus according to claim 20 wherein the optical axis of the objective coincides with the rotational axis of the prism.

22. An apparatus according to claim 20 wherein the objective is connected to the prism.

23. A device for deflecting an optical beam, comprising:
    a prism having a substantially symmetrical structure with reference to a rotational axis;
    said prism having an entry face as well as first and second reflection faces and first and second exit faces;
    the entry face being oriented substantially perpendicularly relative to the rotational axis;
    said first and second reflection faces comprising sides of the prism facing away from the entry face and which have an inclination relative to the rotational axis and which adjoin one another in a region of the rotational axis;
    said first and second exit faces comprises the sides of the prism facing away from the rotational axis and which adjoin the entry face and a respective reflection face and extend from the entry face with increasing distance from the rotational axis; and
    said first and second exit faces being partially mirrored so that the amount of respective reflection or transmission is dependent upon an incident angle of a light beam onto the exit face.

* * * * *